United States Patent [19]

Horowitz

[11] 3,973,704
[45] Aug. 10, 1976

[54] SELF-CONTAINED MEASURING AND DISPENSING DEVICE

[76] Inventor: William Horowitz, 243-20 72nd Ave., Douglaston, N.Y. 11363

[22] Filed: May 23, 1975

[21] Appl. No.: 580,456

[52] U.S. Cl. ............................................. 222/361
[51] Int. Cl.² ........................................ G01F 11/18
[58] Field of Search .......... 222/361, 182, 562, 307, 222/308, 305; 221/263, 264

[56] References Cited
UNITED STATES PATENTS

| | | | |
|---|---|---|---|
| 2,603,386 | 7/1952 | Barnes | 222/361 X |
| 3,227,317 | 1/1966 | Bereziat et al. | 222/562 X |
| 3,458,092 | 7/1969 | McConnell | 222/361 |
| 3,884,393 | 5/1975 | Wassilieff | 222/182 X |

*Primary Examiner*—Robert B. Reeves
*Assistant Examiner*—Francis J. Bartuska
*Attorney, Agent, or Firm*—Allison C. Collard

[57] ABSTRACT

A dispenser for powdered or granular materials having a cylindrical base with inner threads adapted to be screwed onto a rim of a jar, and having a disc integrally connected to the base formed with an intake opening adjacent a periphery thereof, two spaced parallel tracks formed on said disc, wherein the opening is between the two tracks. A cylindical cap is snap-detachably connected to the base and has a central opening formed in a circular top thereof, and a recess formed at a cylindrical edge thereof, adjacent the disc of the base between the tracks. A slide member is slidably disposed in the track extending through the recess and has a cylinder, open at both ends, integrally connected therewith. The slide member tightly engages the disc, and the cylinder thereof tightly engages the top of the cap, yet it is slidable between a first position in which one end of said cylinder is in registration with said central opening, and a second position in which the other end of the cylinder is in registry with the intake opening.

6 Claims, 3 Drawing Figures

SELF-CONTAINED MEASURING AND DISPENSING DEVICE

The present invention relates to a dispenser for powdered or granular food which is adapted to screw onto the top of a jar, and is adapted to readily and simply dispense a granular or powdered material, such as instant coffee, or other foods found in jars or the like.

Prior dispensers of this type had the difficulties of not being able to dispense an exact pre-measured amount of material, and at the same time, not being made of lightweight, simple parts, as well as not having the ability to be easily cleaned, and thus non-clogable.

In the prior art, for example, in Germano, U.S. Pat. No. 3,056,532, a coffee dispenser is provided having four parts, namely, a cap which screws into a jar and having housed and contained therein, a cup member with tracks thereon at a portion remote from the jar opening, the tracks receiving a thickened slider. Disposed on the other side of the slider is a separate disc having an opening into the jar, the slide being disposed between the disc and the cup. With such a device, an excessive number of parts are required, namely, four, and to clean the unit, it is necessary to unscrew the entire main cap to remove the other three parts housed therein.

Accordingly, it is an object of the present invention to provide an accurate dispenser for granular and powdered food and the like which is made of a reduced number of parts, is compact, inexpensive, and readily detachable for cleaning purposes if necessary.

It is another object of the present invention to provide a dispenser with only three parts, including a base part securable by screw threads onto the rim of the jar, and a cap portion snap-detachably connected to the base portion, for facilitating cleaning purposes, whereas the base portion unit does not have to be screwed off the jar.

In accordance with the present invention, there is provided a powdered or granular material dispenser particularly suitable, for example, for fitting onto the top of a coffee jar so that when the jar is inverted, a measured amount of coffee will fall into a cavity, whereupon a pull slider transfers the cavity and coffee therein to the outlet opening of the device.

The device is constructed in three parts, namely, a base portion having threads for coupling to a standard size jar with a disc platform having the inlet opening and a pair of parallel spaced apart slider tracks. The pull-slider is adapted to slide between the tracks of the base portion and includes an upstanding cylinder surrounding the inlet passageway in order to receive a measured amount of powdered coffee. The third element consists of the top cover and includes an outlet opening which is centrally and radially offset from the inlet opening, so that after the powdered coffee fills up the cylinder on the slider, the slider can be pulled to transfer the powdered coffee to the outlet opening where it will be dispensed through the outlet opening.

Other objects and features of the present invention will become apparent from the following detailed description considered in connection with the accompanying drawings which discloses the embodiments of the invention. It is to be understood, however, that the drawings are designed for the purpose of illustration only and not as a definition of the limits of the invention.

In the drawings, wherein similar reference characters denote similar elements throughout the two views.

Figure 1:
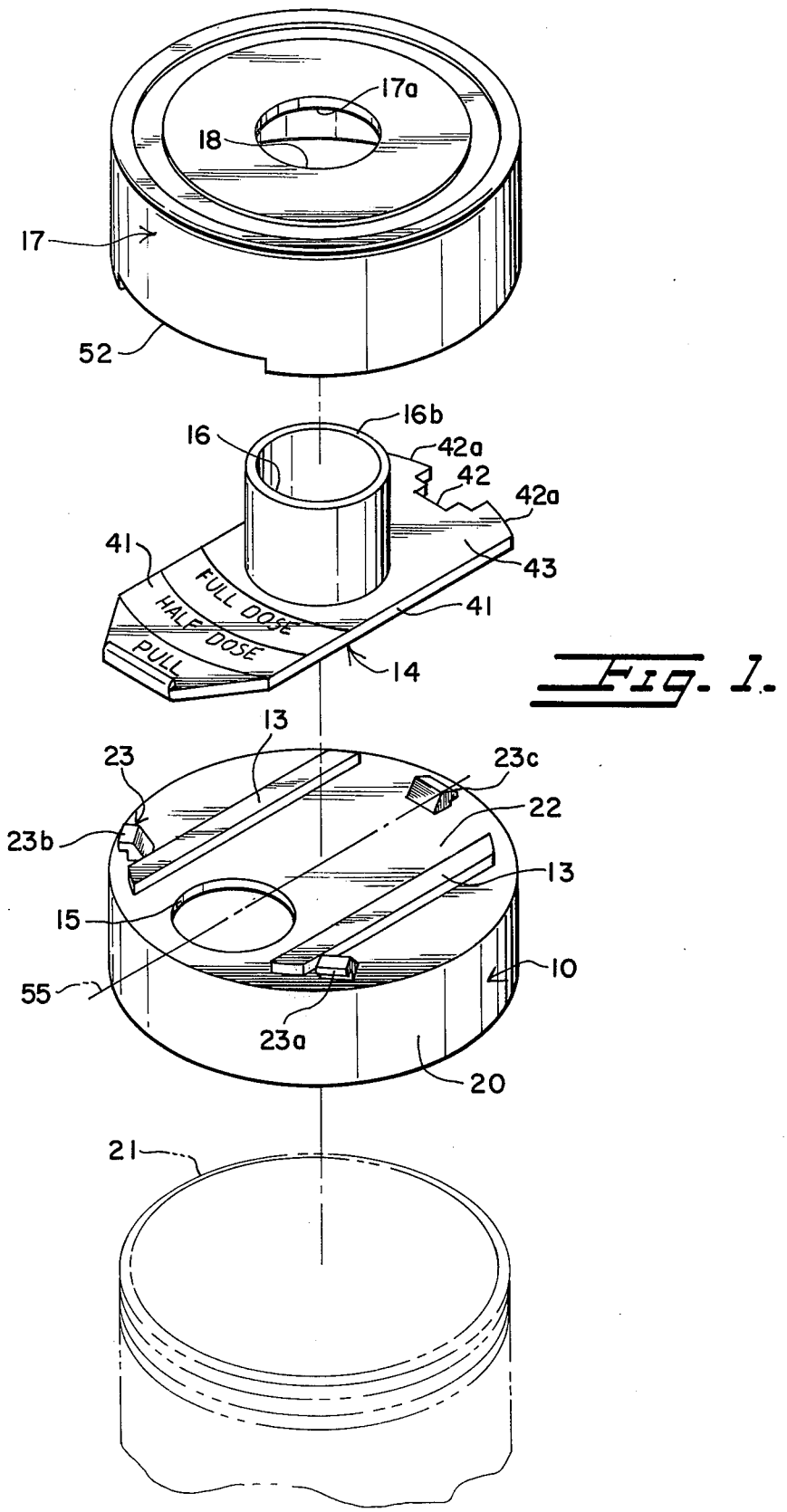
FIG. 1 is a perspective view of the present invention in an exploded view.
Figure 2:
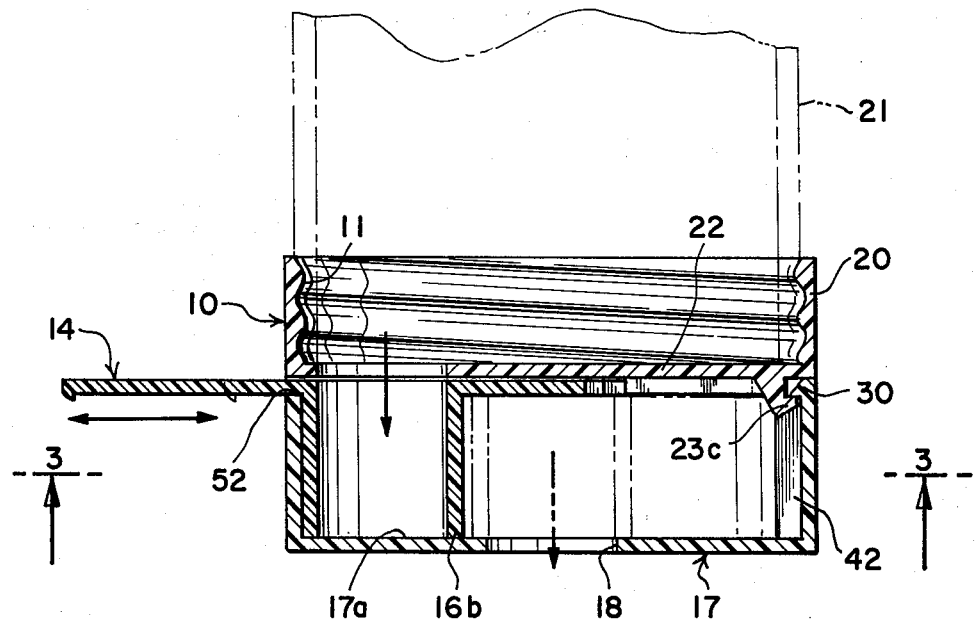
FIG. 2 is a longitudinal cross-section view of the dispenser of the present invention in assembled form.
Figure 3:
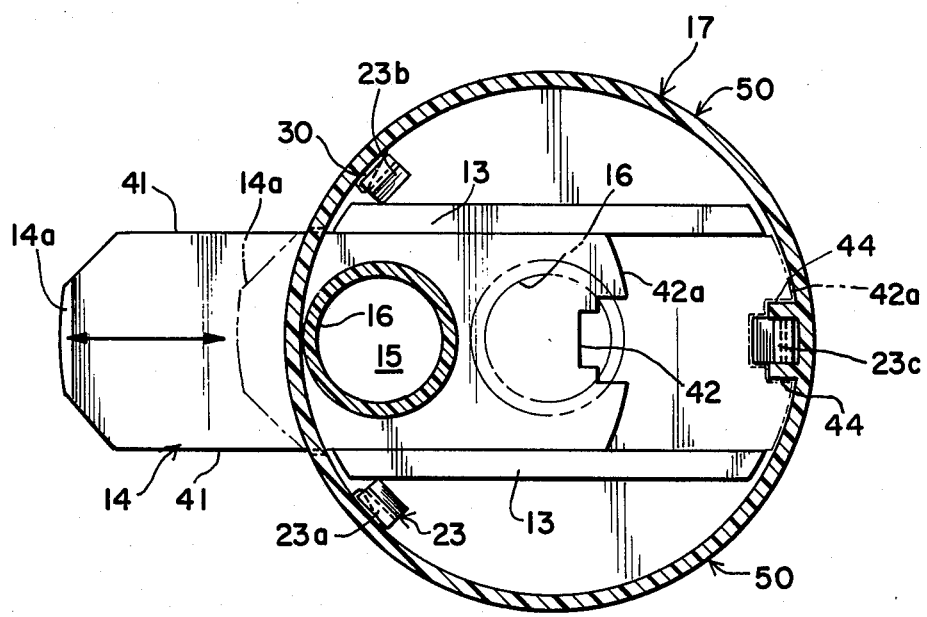
FIG. 3 is a section taken along lines 3—3 of FIG. 2.

Referring now to the drawings, and in particular to FIGS. 1-3, a powdered or granular food dispenser in accordance with the present invention comprises a base element 10 having threads 11 for screwing onto a jar 21 and a flat disc 22 containing two parallel, spaced apart rails 13. A slider 14 is adapted to slide between the rails 13 so that a hole 16 through the slide can be aligned with a hole 15 of the base member 10. When the jar is inverted, powdered coffee will fill the cylinder 16a defining hole 16 of the slider.

A top cap 17 snaps onto the base 10 with the slider therebetween to prevent the powdered coffee from spilling out of the other end of the cylinder 16b. However, when the slider 14 is pulled, the cylinder 16b is brought into alignment with a central hole 18 in the cap 17, and the coffee will spill through the latter hole into a coffee cup. The slider 14 is then returned to its original position as the jar is inverted back to its right side up position.

In particular, the base 10 of the present invention is formed with an opaque cylinder 20 having the interior screw threads 11 adapted to screw onto the top rim 21 of a jar. The clear plastic disc 22 is integrally secured to the cylindrical rim 20 of the base member 10, and has at one portion adjacent its circumference the circular opening 15 which is disposed between the parallel rails or tracks 13, the latter being formed integrally with the disc 22. Adjacent the periphery of the base 10, radially outwardly directed hooks 23a, 23b and 23c are provided which are somewhat disposed inwardly with respect to the periphery of the unit. Two of the hooks 23a and 23b are disposed outside of the tracks 13 adjacent the same ends of the tracks 13 having the opening 15, and a third hook 23c is disposed at the other end of the tracks 13 and therebetween. The hooks form a substantially isosceles triangle, with an acute angle formed at the point defined by the hook 23c between the tracks 13. The hooks 23 are adapted to resiliently snap-lock on abutments 30 of the cap 17, for securing the cap 17 to the base 10, so the cap 17 can readily be snapped off for cleaning.

The slide member 14 is slidably disposed in the tracks 13 cooperating therewith via parallel longitudinal edges 41 with the inwardly facing longitudinal edges of the tracks 13. One end of the slide member is formed with a stepped recess having an inner portion 42 adapted to abut against the hook 23c which is disposed between the tracks, so as to limit the inward movement of the slide 14 when the slide is pressed into its closed position as will be described. A track 44 is formed extending along the inner cylindrical wall of the cap 17 aiding the closing alignment of the cap and base by positioning the hook 23c of the base between the track 44 for locking the cap on the base in the correct position, whereby all hooks 23a, 23b and 23c are in engagement with the cooperating abutments 30 of the cap. In order to remove the cap, it is merely necessary, to press inwardly, slightly at substantially opposed diammetrical portions as indicated by the arrows 50 in FIG. 3, and the cap 17 snaps off the base 12. This is aided by the resiliency of the preferably plastic cap portion 17.

The slide member 14 is formed as a thin plastic base portion 43 which is exactly equal in size to the recess 52 formed in the peripheral edge portion of the cap 17 diammetrically opposite the track 44. In the operative inserted position, as shown in FIGS. 2 and 3, the slide member 14 is slidably disposed through the recess 52 constituting a tongue member. The slide member 43 is formed with the cylinder 16b having cylindrical opening 16 therein, the latter being formed by the inner peripheral walls of the cylinder 16b and being substantially equal in size to that of the opening 75 in the disc 22. The cylinder 16b points toward the cap 17 in the assembled position of the unit.

The opening 15 is disposed on a radial line 55 (FIG. 1), which line 55 also is centrally parallel to the tracks 13 and intersects the axis of the central opening 18 in the cap in the assembled operative position. Accordingly, the slide member 14 is slidable between an inward position of the slide member (dashed lines in FIG. 3), with the recess 42 abutting the rear portion of the hook 23c. In this position, the slide 14 4 is disposed such that the opening 16 in the cylinder 16b is in perfect registry with the opening 18 in the cap 17.

In the assembled position, the inner top surface 17a of the cap and the free edge of the cylinder 16b are in exact flush engagement, with no space therebetween. In this manner, granular or powdered food which may be in the cylinder 16b may be pushed along the surfaces 17a of the cap 17 without loss therefrom by sliding the slide member.

The cylinder 16b is open on both of its ends, and on the end remote from the cap, the slide member 14 is in tight engagement with the upper portion of the disc 22, so that also here when coffee is in the cylinder 16b, defining a measured portion, the coffee can be held and moved without loss by sliding the slide member to the outlet opening 18. A minimum, if any coffee enters the unit outside of the cylinder. In case any residual coffee gets in the unit, one can remove the cap from the base for cleaning by the simple snap release heretofore described.

In the assembled position, the slide member 14 is radially movable between the two positions of registry of the cylinder 16b with the inlet opening 15 and the outlet opening 18, respectively. The rear end 42a of the slide member 14 adjacent the recess 42 are formed arcuate and complementary to the shape of the inner periphery of the cylinder cap 17 to aid the stable registry of the cylinder 16a with the outlet opening 18. In this portion, although not shown, just the front tip, namely, portion 14a of the slide, as shown in dashed lines in FIG. 3, projects from the cylinder periphery of the unit.

In operation, when it is desired to dispense coffee or the like, the jar is turned upside down, and the slide member 14 is moved radially outwardly along the diammetric line 55, until the half dose or full dose marking, as desired, is aligned with the periphery of the cap and base. At this portion, the cylinder 16b, e.g. in the full dose position, is in corresponding registry with the inlet opening 15, and the cylinder 16b fills.

For dispensing the coffee as described above, the slide member 14 is now pushed inwardly, whereby the slide stops due to the abutment of its rear portions 42 and 42a against the hook 23c and inner wall surface of the cylinder 20, such that the opening 16 of the cylinder 16b is in perfect registry with the central opening 18 of the cap 17, whereupon the coffee is dispensed.

While onle a single embodiment of the present invention has been shown and described, it will be obvious that many changes and modifications may be made thereunto without departing from the spirit and scope of the invention.

What is claimed is:

1. A self-contained measuring and dispensing device for powdered or granular materials comprising:

a cylindrical base having inner threads adapted to be screwed onto a rim of a jar, and having a disc integrally connected to said base formed with an intake opening adjacent a periphery thereof, two spaced parallel rails formed on said disc, said opening being between said two tracks;

a cylindrical cap snap-detachably connected to said base and having a central opening formed in a circular top thereof, and a recess formed at a cylindrical edge thereof adjacent said disc of said base between said rails;

said base including three hook members defining an acute angle isosceles triangle, with the apex of the acute angle at one of said hook members and positioned between said rails, said one hook member being disposed between said two rails at an end thereof diametrically opposite to said intake opening, the other two of said hook members being disposed on opposite sides of said two rails aligned adjacent said intake opening, said hook members being inwardly disposed relative to the periphery of said disc and having hooks facing said periphery thereof;

said slide including a stepped recess adapted to engage said first hook member in said first position of said slide; and said cap being formed therein with abutment means corresponding in position to said hook members and cooperating therewith for releasable snap locking of said cap onto said base and holding said slide member in vertical alignment with said rails, said cap also including a track member adjacent said one hook member extending into said stepped recess and parallel to the axis of said cylinder cap and having thereon one of said abutment means, said stepped recess cooperating with said first hook member and said track member for proper alignment of said cap and said slide, said recess in said cap being diametrically opposite to said track member.

2. The device as recited in claim 1, wherein said central opening in said cap is coaxial relative to said cylindrical cap.

3. The device as recited in claim 1, wherein said intake opening is disposed on an imaginary line equidistant between said tracks and intersecting the axis of said central opening.

4. A self-contained measuring and dispensing device for powdered or granular materials comprising:

a cylindrical base having inner threads adapted to be screwed onto a rim of a jar, and having a disc integrally connected to said base formed with an intake opening adjacent a periphery thereof, two spaced parallel rails formed on said disc, said opening being between said two tracks;

a cylindrical cap snap-detachably connected to said base and having a central opening formed in a circular top thereof, and a recess formed at a cylindrical edge thereof adjacent said disc of said base between said rails;

a slide member having a base portion slidably disposed between said rails extending through said recess and having a cylinder open at both ends integrally connected to said base portion, said slide member tightly engaging said disc between said rails, and said cylinder thereof tightly engaging said top of said cap, yet controllably slidable between a first position in which one end of said cylinder is in registry with said central opening and a second position in which the other end of said cylinder is in registry with said intake opening;

three hook members, a first hook member positioned on said base portion between said rails and a pair of hook members positioned on said base portion on opposite sides of said rails;

said slide member including one end formed with a stepped recess adapted to abut against said first hook member in said first position of said slide;

said hook members being positioned at the corners of an isosceles triangle with said first hook member positioned at the apex and said other hook members at the opposite sides of the base of said isosceles triangle and positioned on opposite sides of said recess in said cap for positioning and holding said cap onto said base with said stepped recess in said slide in engagement with said first hook member; and said cap including a track fitting with said stepped recess and in cooperation with said hook member and said recess in said cap for holding said cap in proper alignment on said base against rotary movement relative thereto and permitting uniform sliding movement of the slide member between said rails and said first-mentioned recess.

5. The device as claimed in claim 4, wherein the base portion of said slide member has a thickness substantially equal to the height of the inwardly facing portions of said rails, said slide member being slidable between said rails in a direction transverse and parallel thereto.

6. The device as claimed in claim 5, wherein said recess in said cap is aligned with and in registry with a slide area formed between said rails, said base portion of said slide member being positioned in said slide area with the front tip portion of said slide member passing through said recess, whereby said recess in cooperation with said rails, guides said slide member solely for transverse movement between said rails and parallel thereto.

* * * * *